Nov. 25, 1930.  U. A. INMAN  1,782,725
SHOCK ABSORBER
Filed Aug. 17, 1929
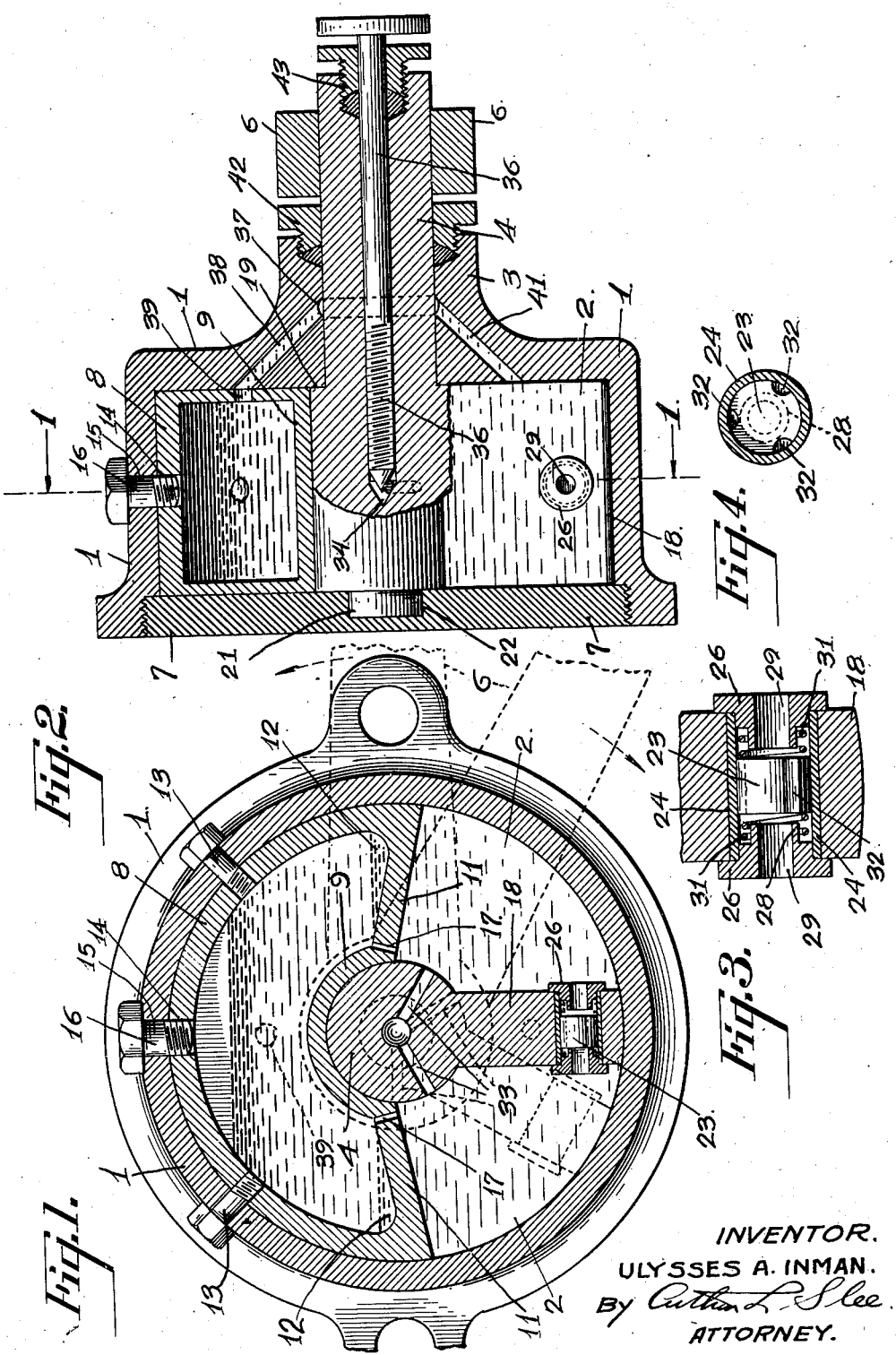
INVENTOR.
ULYSSES A. INMAN.
By Arthur L. Slee
ATTORNEY.

Patented Nov. 25, 1930

1,782,725

UNITED STATES PATENT OFFICE

ULYSSES A. INMAN, OF LONG BEACH, CALIFORNIA

SHOCK ABSORBER

Application filed August 17, 1929. Serial No. 386,704.

My invention relates to improvements in shock absorbers for automobiles and the like wherein a vane is movable to displace oil through restricted passages between compartments of an oil chamber to retard relative movement between the body and an axle of an automobile when the springs of said automobile are flexed, the degree of restriction being automatically increased under extreme shocks.

The primary object of my invention is to provide an improved shock absorber of the "hydraulic" type.

Another important object is to provide an improved shock absorber wherein a moving vane operates within a chamber having oil or other liquid agent supplied therein from a reservoir adapted to keep said chamber operatively filled irrespective of ordinary leakage of oil and the admitting of air into the chamber and reservoir.

A further object is to provide an improved device of the character described wherein oil may be displaced against a normally light restriction under ordinary road shocks and wherein the restriction is automatically increased under severe shocks, to regulate the restriction in proportion to the shock.

Another object is to provide an improved device wherein passages normally permitting a restricted flow of oil, under normal displacement of a vane, are automatically closed under severe shock or extreme movement.

A further object is to provide an improved device wherein the moving parts are lubricated by oil circulated by the action of said moving parts.

A further object is to provide an improved device of the character described wherein sediment and foreign matter carried by the oil will be collected in pockets apart from the moving parts of the device to reduce wear and to maintain efficiency.

Another object is to provide an improved check valve for devices of the character described wherein a restricted flow of oil is normally permitted through a passage adapted to be entirely closed under sudden or severe shocks.

A still further object is to provide a device of simplified and improved construction affording economy in production and efficiency in operation.

I accomplish these and other objects by means of the improved device disclosed in the drawings forming a part of the present application wherein like characters of reference are used to designate similar parts throughout the drawings and specification and in which:—

Fig. 1 is a broken vertical transverse section of my improved shock absorber;

Fig. 2 is a broken vertical longitudinal section of the device;

Fig. 3 is a longitudinal section of the check valve, the figure being drawn upon an enlarged scale; and Fig. 4 is a transverse section of the check valve.

Referring to the drawings, the numeral 1 is used to designate in general a body adapted to be secured upon the chassis of an automobile, not shown, in any suitable manner. The body 1 has an oil chamber 2 formed therein and is provided with a reduced extension 3 within which is journalled a shaft 4 provided with an arm 6 adapted to be connected in any suitable manner to the axle, or other portions, not shown, of the automobile movable relative to the chassis when the springs of the automobile are flexed by road shocks. The body 1 is constructed with the end opposite the extension 3 open, a member 7 being mounted to close said open end when the device is assembled.

A reservoir member 8 is mounted within the upper portion of the chamber 2. The member 8 consists of a hollow body having a bearing portion 9 seating upon the shaft 4, said body fitting closely to the walls of the chamber 2 and having bottom walls 11 inclined downwardly from the bearing portion 9 to the wall of the body 1 to form pockets 12 within the lower corners of the reservoir. The reservoir is secured in operative position within the upper portion of the chamber 2 by means of suitable securing members 13, such as machine screws, tapped into the reservoir through the adjacent wall of the body 1. A filler opening 14 is formed in the top of the reservoir 8 to match with an opening 15 formed in the body 1, said opening being normally closed by a suitable plug 16 removable to permit the reservoir to be filled as required. Restricted passages 17 are formed in the bottom walls 11 adjacent the bearing portion 9 and above the level of the pockets 12 to permit a restricted flow of oil between the reservoir and the lower portion of the chamber 2.

The shaft 4 is provided with a vane 18 extending downwardly from the shaft into the lower portion of the chamber 2 and forming a close sliding fit with the walls of the body 1. The shaft is preferably shouldered as at 19 to seat against the back wall of the body 1, and a reduced extension 21 is preferably formed upon the end of the shaft to seat within a bearing recess 22 formed in the member 7 to provide additional bearing support for the shaft. The vane 18 divides the lower portion of the chamber 2 into two compartments each communicating with the reservoir 8 through the passages 17 upon opposite sides of the bearing portion 9.

A balanced check valve is mounted within the vane 18 adjacent the lower end thereof, said valve comprising a valve member 23 slidably mounted within a sleeve 24 mounted within the vane 18 and forming an oil passage therethrough. Collars 26 are tapped or otherwise secured upon the ends of the sleeve 24 and provided with inwardly disposed extensions 28, said collars 26 having passages 29 formed therein coaxial with the sleeve 24 and valve member 23. Light springs 31 are mounted within the sleeve 24 upon opposite sides of the valve member 23 to normally hold said valve member in balanced position midway between the extensions 28 and out of engagement with both of said extensions. Passages 32 are formed to permit a restricted flow of oil through the sleeve 24 and past the valve member 23, said passages preferably consisting of grooves formed longitudinally upon the surface of the member 23.

Auxiliary oil passages 33 are formed in the shaft 4 to open into the chamber 2 upon opposite sides of the vane 18. The passages 33 incline in opposite directions from the axis of the shaft 4 and open at their inner ends into a chamber 34 within the shaft 4. A needle valve 36 is mounted axially within the shaft 4 to extend into the chamber 34 whereby the flow of oil through the auxiliary passages 33 may be regulated and restricted to a desired degree. The passages 33 normally open into the chamber 2 at points spaced below the edges of the bearing portion 9 of the reservoir. When the shaft 4 is turned through a prescribed degree of movement, in either direction, the opening to one of the passages 33 will be moved past the adjacent edge of the bearing portion 9, as indicated in dotted lines in Fig. 1, thereby closing said passage and preventing the movement of oil therethrough.

An oil channel 37 is formed within the reduced extension 3 of the body 1 to supply oil to the shaft 4 journalled therein. A passage 38 is formed in the body 1 to connect the channel 37 with the oil reservoir 8 through an opening 39 formed in the wall thereof, and a passage 41 connects the channel to the lower portion of the chamber 2. Suitable stuffing glands 42 and 43 are provided to prevent leakage of oil past the shaft 4 and past the needle valve 36 respectively.

In operation, the body 1 is secured to the chassis of an automobile and the arm 6 connected to the axle or other relatively movable portion of the automobile whereby the shaft is oscillated as the springs of the automobile are flexed in the ordinary manner. The vane 18 is normally positioned in substantially vertical position dividing the lower portion of the chamber 2 into substantially equal compartments. The chamber 2 and reservoir are filled with oil or other suitable liquid, oil from the reservoir flowing through the passages 17 to entirely fill the lower portion of the chamber 2, and any air present or entering into the chamber 2 rising and escaping upwardly through said passages 17 into the reservoir by reason of the inclined lower walls 11 of the reservoir member 8.

The slight oscillating movement imparted to the shaft 4 and vane 18, as the automobile springs are flexed when the automobile passes over slight irregularities in the surface traversed, causes oil to be displaced from one of the compartments to the opposite compartment of the chamber 2, depending upon the direction in which the vane is moved. Oil thus displaced may pass to the opposite chamber through the restricted passages 17 and 33 and also through the passages 32 of the check valve, the oil displaced through one passage 17 in the reservoir 8 causing a corresponding amount to be displaced through the opposite passage 17 to keep the lower portion of the chamber entirely filled with oil at all times. The combined resistance offered by the several passages retards the movement of the vane and thus checks the relative movement of the chassis and axle sufficiently to prevent excessive spring action without appreciably stiffening the action of the spring. During such minor movements of the vane 18, the valve member 23 remains balanced between the springs 31 and oil may pass through the sleeve 24 and passages 32 without materially affecting the valve member.

In event a severe shock is encountered, the vane is moved very rapidly through a relatively large degree of movement. In this case, the oil forced through the sleeve 24 causes the member 23 to be moved against the end of one of the extensions 28 as shown in Fig. 1 and thereby close the passage 29 therethrough. This movement of the valve member 23 is the result of the combined action of inertia, and the pressure and velocity of oil forced into the sleeve 24 and against the valve member 23, said valve member being held against the extension 28 by the pressure of the oil and thereby effectually checking the flow of oil through the sleeve during the further movement of the vane 18. The oil displaced from one compartment now must pass through the passages 17 and 33, thus automatically increasing the restriction when a severe shock is encountered. Upon the return movement, the valve member 23 is moved to close the passage 29 through the opposite collar 26, thereby restricting the flow of oil in like manner during the return movement.

If the shock encountered is very severe, the vane 18 is moved sufficiently to cause one of the passages 33 to be moved back of the bearing portion 9 of the reservoir member, thereby closing said passage and restricting the flow of oil, from one compartment to the other, to the passages 17, thereby still further increasing the resistance to movement as the extreme limit of movement is approached.

The reservoir 8 is preferably kept substantially full of oil. However, unavoidable leakage will reduce the supply slightly and a certain amount of air will be drawn into the device. By my present improved construction, this air will accumulate in the top of the reservoir 8 as shown in the drawings and the lower portion of the chamber will be kept entirely filled with oil at all times. In this manner it is assured that the action of the vane 18 will not be affected by such air, and a uniform efficiency will be maintained irrespective of any ordinary reduction of the supply of oil in the reservoir 8.

The shaft 4 is efficiently lubricated by means of the oil channel 37. As the shaft 4 and vane 18 are oscillated, oil may flow from the reservoir to the channel through the passage 38 and from the channel to the chamber 2 through the passage 41, thus insuring a circulation of oil through the channel. The passage 41 preferably opens at a point covered by the vane 18 when in normal position, so that oil will be displaced through the channel 37 only when the vane is moved through a relatively large degree of movement. The passages 38 and 41 are sufficiently restricted to maintain the desired resistance against the movement of the vane 18.

Sediment or foreign matter carried by the oil settles and is received within the pockets 12 of the reservoir member 8, and as the oil passing through the passages 17 enters the reservoir at a point above the level of the pockets 12, this sediment will not be disturbed or carried back into the chamber 2 to cause wear upon the vane 18 or interfere with the efficient operation of the check valve member 23.

The specific details of construction illustrated and described are subject to modification in various ways without departing from the spirit of my invention, and I therefore desire to avail myself of such modifications as may fall within the scope of the appended claims.

Having thus described my invention what I claim as new and desire to secure by Letters Patent is:

1. A shock absorber comprising a body adapted for attachment upon the chassis of an automobile and having an oil chamber therein; a shaft mounted upon the body and extending into the chamber, said shaft being provided with an actuating arm adapted for attachment to the automobile at a point movable relative to the chassis when the springs of the automobile are flexed; a reservoir member mounted within the upper portion of the chamber above the shaft and having a bearing portion engaging the shaft, said member having restricted passages communicating with the chamber upon opposite sides of the shaft; a vane carried by the shaft and extending downwardly into the chamber, said vane forming a close sliding fit against the walls of the chamber and dividing said chamber into compartments; a balanced check valve mounted within the vane to normally permit a restricted flow of oil therepast in either direction when the vane is moved by a slight movement of the arm and shaft, and being movable to check said flow if the vane is moved rapidly in either direction; auxiliary passages formed through the shaft to communicate between the compartments and permit a limited flow of oil from one compartment to the other independently of the check valve; an oiling channel formed within the body around the shaft; and passages connecting said channel with the chamber and with the reservoir whereby oil may be circulated through said channel to lubricate the shaft.

2. A shock absorber comprising a body adapted for attachment upon the chassis of an automobile, and having an oil chamber therein; a shaft mounted upon the body and extending into the chamber, said shaft being provided with an actuating arm adapted for attachment to the automobile at a point movable relative to the chassis when the springs of the automobile are flexed; a reservoir member mounted within the upper portion of the chamber above the shaft and having a bearing portion engaging the shaft, the lower walls of said reservoir inclining downwardly away from said bearing portion to form pockets within the bottom of said member; restricted passages formed in the bottom walls of the reservoir adjacent the bearing portion and above the level of the pockets to communicate with the chamber upon opposite sides of the shaft; a single vane carried by the shaft and extending downwardly into the chamber in close sliding fit against the walls of the chamber and dividing said chamber into compartments; and a balanced check valve mounted within the vane to normally permit a restricted flow of oil therepast in either direction when the vane is moved by a slight movement of the arm and shaft, and being movable to check said flow if the vane is moved suddenly through a relatively large movement in either direction.

3. A shock absorber comprising a body adapted for attachment upon the chassis of an automobile, and having an oil chamber therein; a shaft mounted upon the body and extending into the chamber, said shaft being provided with an actuating arm adapted for attachment to the automobile at a point movable relative to the chassis when the springs of the automobile are flexed; a reservoir member mounted within the upper portion of the chamber above the shaft and having a bearing portion engaging the shaft, the lower walls of said reservoir inclining downwardly away from said bearing portion to form pockets within the bottom of said member; restricted passages formed in the bottom walls of the reservoir adjacent the bearing portion and above the level of the pockets to communicate with the chamber upon opposite sides of the shaft; a single vane carried by the shaft and extending downwardly into the chamber in close sliding fit against the walls of the chamber and dividing said chamber into compartments; a balanced check valve mounted within the vane to normally permit a restricted flow of oil therepast in either direction when the vane is moved by a slight movement of the arm and shaft, and being movable to check said flow if the vane is moved suddenly through a relatively large movement in either direction; and auxiliary passages formed through the shaft to communicate between the compartments and normally permit a limited flow of oil from one compartment to the other, the ends of said passages being movable into engagement with the bearing portion of the reservoir member to close said passages when the shaft is turned through a predetermined degree of movement.

4. A shock absorber comprising a body adapted for attachment upon the chassis of an automobile, and having an oil chamber therein; a shaft mounted upon the body and extending into the chamber, said shaft being provided with an actuating arm adapted for attachment to the automobile at a point movable relative to the chassis when the springs of the automobile are flexed; a reservoir member mounted within the upper portion of the chamber above the shaft and having a bearing portion engaging the shaft, the lower walls of said reservoir inclining downwardly away from said bearing portion to form pockets within the bottom of said member; restricted passages formed in the bottom walls of the reservoir adjacent the bearing portion and above the level of the pockets to communicate with the chamber upon opposite sides of the shaft; a single vane carried by the shaft and extending downwardly into the chamber in close sliding fit against the walls of the chamber and dividing said chamber into compartments; a balanced check valve mounted within the vane to normally permit a restricted flow of oil therepast in either direction when the vane is moved by a slight movement of the arm and shaft, and being movable to check said flow if the vane is moved suddenly through a relatively large movement in either direction; auxiliary passages formed through the shaft to communicate between the compartments and normally permit a limited flow of oil from one compartment to the other, the ends of said passages being movable into engagement with the bearing portion of the reservoir member to close said passages when the shaft is turned through a predetermined degree of movement; and adjustable means for restricting the flow of oil through said auxiliary passages.

5. In a shock absorber, the combination with a body having an oil chamber therein, and a shaft rotatably mounted upon said body and extending into the chamber, said shaft being actuated by the flexing of the springs of an automobile, of a vane carried upon the shaft and movable within the lower portion of the chamber; and a reservoir mounted within the upper portion of the chamber and provided with a bearing portion resting upon the upper side of the shaft, the bottom walls of said reservoir being inclined downwardly away from said bearing portion to form pockets within the bottom of said member and having passages formed adjacent the bearing and above the level of the pockets whereby the chamber may be kept operatively filled with oil and sediment may be caught and retained in said pockets.

6. In a shock absorber, the combination with a vane movable within an oil chamber, of a check valve comprising a valve member slidably mounted within an oil passage formed through the vane; passages formed to permit a flow of oil past the valve member; apertured inlet and outlet members mounted at the ends of the passage and having inwardly disposed extensions adapted to be engaged by the valve member; and springs mounted upon opposite sides of the valve member and the adjacent inlet and outlet members to normally hold the valve member in a balanced position between said inlet and outlet members and out of engagement with the inwardly disposed extensions thereof to normally permit a slow flow of oil through the inlet and outlet openings and past the valve member, the valve member being movable against the resistance of said springs to engage an inwardly disposed extension and close the opening therethrough when oil is forced rapidly past the valve member in either direction.

7. In a shock absorber, the combination with a body having an oil chamber, a reservoir member mounted within the chamber, and a shaft journalled upon the body and extending into the chamber and operable by the flexing of the springs of an automobile to actuate a vane movable within the chamber, of an oil channel to carry oil to the shaft journal; and passages connecting said channel with the chamber and with the reservoir to permit a restricted circulation of oil between the reservoir and the chamber through the oil channel when the vane is moved within the chamber.

In witness whereof, I hereunto set my signature.

ULYSSES A. INMAN.